June 11, 1957 S. A. PROCTER 2,795,644

PHASE-SENSITIVE SYNCHRONIZING CIRCUIT

Filed Nov. 29, 1954

INVENTOR.
SAMUEL A. PROCTER

BY

Gomp, McDougall, Williams & Hershey

ATTORNEYS 2,795,644

PHASE-SENSITIVE SYNCHRONIZING CIRCUIT

Samuel A. Procter, Chicago, Ill.

Application November 29, 1954, Serial No. 471,649
6 Claims. (Cl. 178—7.5)

Figures 1, 2, 3, 4:
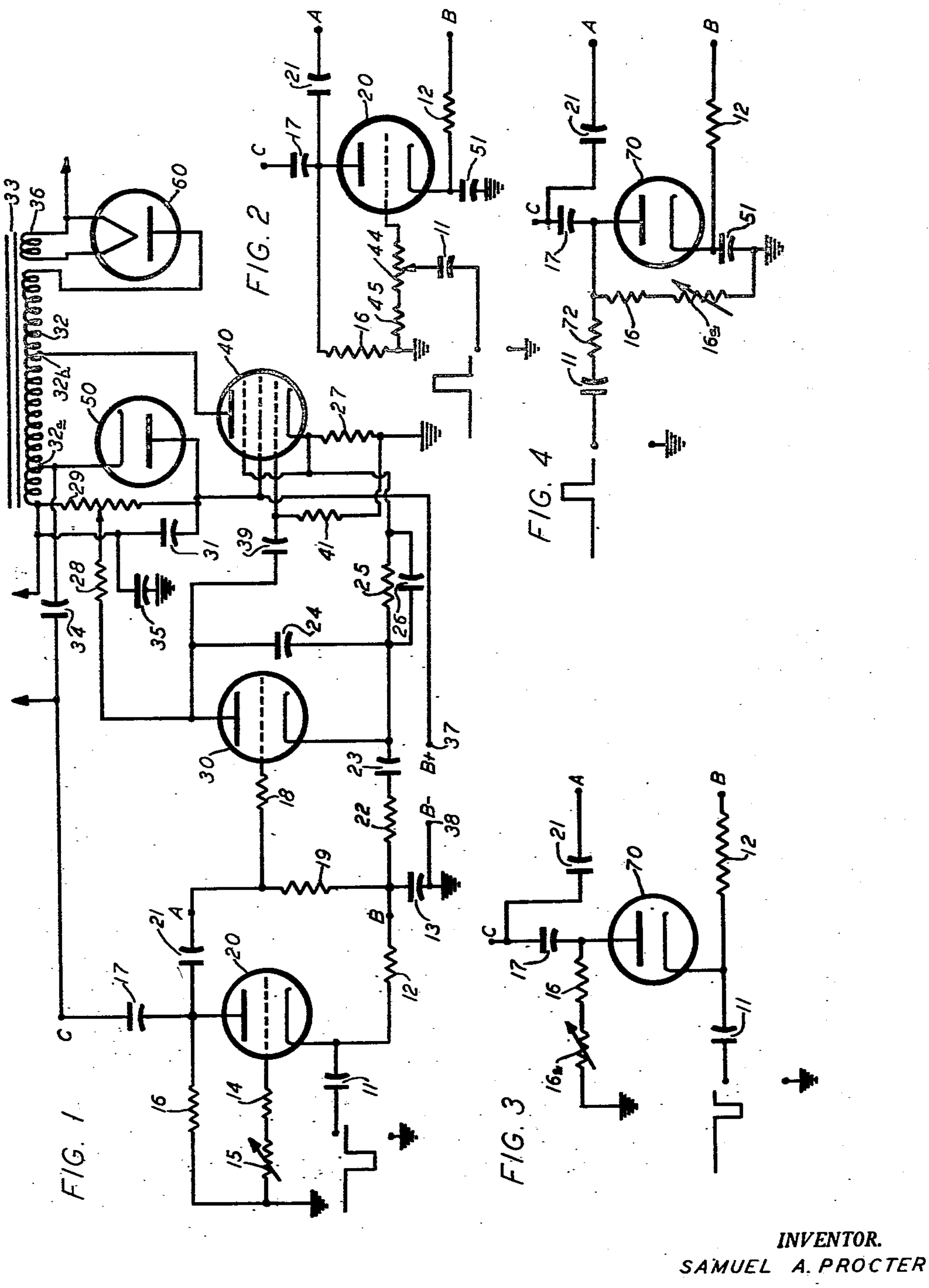

This invention relates broadly to apparatus for sensing relative phase of two periodic waves; in particular, it is addressed to a simple phase-sensitive circuit particularly useful in television receivers for synchronizing the sweep generating circuits thereof responsively to pulses derived from the receiver signal. This invention embodies some of the principles described and claimed in my earlier copending applications Serial No. 299,532, filed July 18, 1952, and 436,070, filed June 11, 1954, and is hence a continuation in part of those applications.

The scanning voltages or currents required for tracing out the raster on the screen of a television picture tube are generated locally in the television receiver, usually by amplifying and shaping the output waves of suitable local oscillators. The actual wave of voltage or current applied to the deflecting elements of the picture tube is normally of sawtooth conformation, to provide a linear presentation, and includes a rapid retrace or "flyback" portion in which the sweep voltage or current changes very rapidly in returning the electron beam from one side of the screen to the other.

The flyback is accompanied by a surge of voltage or current in the deflecting circuit, depending on whether the television receiver uses magnetic or electric beam deflection. In present-day practice, magnetic deflection is almost universally used, so that the flyback surge is typically a voltage surge of considerable magnitude—several hundred volts or more. This flyback pulse is very short in duration compared to the period of the entire sawtooth wave. In the horizontal deflection circuits in present-day receivers, the flyback pulse duration is at most a few microseconds. The flyback pulse in the vertical deflection circuits is of course proportionately longer since the frequency of vertical deflection is normally only 60 cycles per second, whereas the horizontal deflection frequency is 15,750 cycles per second.

It is of course imperative that the locally generated sweep frequencies in a television receiver correspond exactly with the sweep frequencies used in the television camera at the transmitting station, and to achieve such exact correspondence the transmitting station sends out "synchronizing pulses" during the intervals between successive bursts or trains of video signal. The duration of these synchronizing pulses are of roughly the same order of magnitude as the flyback pulses and normally occur at very nearly in synchronism therewith, when the local sweep circuits in the television receiver are functioning properly.

Obviously each television receiver must provide some means for utilizing the received synchronizing pulses to control the frequency of the local horizontal and vertical sweep oscillators. In the development of television-receiving techniques, numerous circuits have been designed for that purpose, varying greatly both in complexity and effectiveness.

The cheaper and simpler sweep-synchronizing circuits of the prior art have in general possessed the disadvantage that they were subject to being seriously affected by random noise pulses, such as are often produced by atmospheric static, lightning, engine ignitions, etc.

More elaborate synchronizing circuits, commonly called "A. F. C. sync circuits," have been developed which are not nearly so affected by random noise pulses. Those circuits, however, are quite complicated, usually involving several tubes and rather complex circuitry.

In the aforementioned copending application Serial No. 299,532 I have disclosed and claimed a highly effective A. F. C. sync circuit, simpler than those of the prior art, in combination with a novel sawtooth generator. In my other copending application, Serial No. 436,070, I have described a highly simplified synchronizing circuit which may be used in conjunction with my aforesaid novel sawtooth generator or with conventional saw-tooth generators. In the present specification, I shall describe an improved form of synchronized sweep-generator circuit comprising a modified form of sawtooth generator embodying the principles disclosed in my aforesaid application No. 299,532, in combination with a synchronizing circuit embodying the principles taught in my application No. 436,070 but particularly adapted for phase comparison of two pulse trains, namely the train of synchronizing pulses and the train of flyback pulses.

My invention as herein disclosed has as its primary object the provision of a simple and inexpensive sweep circuit which is almost completely insensitive to random noise pulses.

In achieving that primary object, I have also the additional object of providing a sweep circuit in which the circuit elements responsive to signal-derived synchronizing pulses is gated so as to be wholly cut off from the signal source except during the critical short time intervals in which synchronization is accomplished.

In other words, in the present invention I achieve insensitivity to noise by cutting off the synchronizing circuits from the signal circuits at virtually all times except the brief intervals in which the synchronizing pulses are actually being received. Thus noise energy arriving at other times never reaches the synchronizing circuits and has absolutely no effect on them. This mode of operation is in sharp contrast to the operation of prior-art sweep systems, in which noise energy was free to enter the synchronizing system at all times and in which the effect of such noise energy was reduced by means of resonant tank circuits or other energy-storage devices. Hence, to provide such a gated sweep system is another of the objects of my invention.

Still other objects and advantages of the present invention will be apparent from the detailed description herein of typical embodiments thereof.

In the accompanying drawing I have shown two basic forms of my invention, one employing a triode synchronizing tube and the other employing a diode tube for the same purpose. Each of those forms of my invention has been shown as designed for operation with negative synchronizing pulses, and, in addition, the appropriate circuit modifications have been illustrated for employing each form of the invention in conjunction with positive synchronizing pulses.

In the appended drawing, Figure 1 shows the schematic circuit diagram of a typical embodiment of my invention, employing a triode synchronizing tube and adapted for use with negative synchronizing pulses. Fig. 2 is a fragmentary schematic diagram showing the appropriate modification of the Fig. 1 circuit to adapt it for use with positive synchronizing pulses. Fig. 3 is a schematic diagram showing a modified form of my invention wherein the triode synchronizing tube is replaced with a diode, and Fig. 4 is a schematic diagram showing the Fig. 3 structure modified for use with positive synchronizing pulses.

In studying the appended drawing, the reader skilled in the art will understand that I have shown my circuit as it might be employed in a typical television receiver constructed in general conformity with current commercial practice. I have shown, however, only those portions of the television receiver more or less directly associated with my novel circuits, it being understood that the remainder of the receiver may be conventional.

Referring now to Fig. 1, I have shown therein a circuit comprising five electron tubes, of which triode 20 acts as gated synchronizing tube, triode 30 functions as sawtooth-wave oscillator, pentode 40 acts as sawtooth-wave amplifier, diode 50 acts as damper tube, and diode 60 acts as high-voltage rectifier. In general, tubes 40, 50, and 60, with their associated circuitry, are conventional components of a modern television receiver, the novel features of the present invention being associated primarily with tubes 20 and 30.

Negative synchronizing pulses derived from the incoming television signal are applied through coupling capacitor 11 to the cathode of tube 20. The cathode of tube 20 is also connected to one terminal of a resistor 12, the other terminal of resistor 12 being connected to ground through a filter capacitor 13.

The grid of tube 20 is connected to ground through a fixed resistor 14 and a variable resistor 15, connected in series. The plate of tube 20 is connected to ground through a resistor 16, and is also connected to one side of the horizontal-deflection yoke or coil (not shown) through a coupling capacitor 17. (While I have in the drawing shown my invention as applied in connection with the horizontal-deflection sweep circuit of a television receiver, it will be understood that my invention may also be employed for synchronizing the vertical-deflection circuits.)

The grid of tube 30 is connected to the junction of elements 12 and 13 through a series network comprising resistors 18 and 19. The junction of resistors 18 and 19 is connected to the plate of tube 20 through a low-capacitance capacitor 21. The cathode of tube 30 is connected to the junction of elements 12 and 13 through a series network comprising resistor 22 and capacitor 23. In addition, the cathode of tube 30 is connected to the plate of the same tube by means of a capacitor 24. (In some cases, depending on the shape of the flyback pulse, it may be desirable to use a two-stage differentiator circuit instead of the single-stage arrangement comprising capacitor 21 and resistor 19.)

The cathode of tube 30 is connected to the cathode of tube 40 through a parallel network comprising resistor 25 and capacitor 26. The cathode of tube 40, in turn, is connected to ground through resistor 27.

The plate of tube 30 is connected through resistor 28 to the movable arm of a potentiometer 29. Potentiometer 29 is shunted by a by-pass capacitor 31; one terminal of potentiometer 29 is connected to the plate of diode 50, and the other terminal is connected to one terminal of the main winding 32 of horizontal-sweep transformer 33. In the drawing, transformer 33 is portrayed as having a single large winding plus a small auxiliary winding used for heating the filament of rectifier tube 60; such transformers are conventional in present-day television practice. It should be understood, however, that that type of transformer is shown in the drawing merely as illustrative of existing commercial arrangements.

A tap **32*a* on winding 32 is connected to the cathode of damper tube 50 and is also connected through coupling capacitor 34 to the same side of the deflection yoke to which capacitor 17 is connected. The other terminal of the deflection yoke is connected to the junction of coil 32 and potentiometer 29, and is by-passed to ground by capacitor 35. Filament winding 36 of transformer 33 is connected to the filament of rectifier tube 60, and the other terminal of winding 32 is connected to its plate. As is conventional, the high voltage for the second accelerating anode of the picture tube is taken from the filament of tube 60**.

A tap **32*b* on winding 32 is connected to the plate of tube 40. The screen grid of tube 40 and the plate of damper tube 50 are connected to the positive terminal 37 of a suitable D.-C. power supply, the negative terminal 38** thereof being grounded.

The plate of tube 30 is coupled to the grid of tube 40 through a capacitor 39, the grid of tube 40 being connected to ground through a gridleak resistor 41.

It will of course be understood that the various circuit elements herein shown may vary widely in electrical characteristics, according to the particular vacuum tubes used and the characteristics of the associated circuits of the television receiver in which my invention is incorporated. Purely as illustrative of a typical design, however, I have found the following parts values to be satisfactory:

| Element: | | Value |
|---|---|---|
| 11 | mmf | 100 |
| 12 | ohms | 560,000 |
| 13 | mmf | 560 |
| 14 | ohms | 39,000 |
| 15 | do | 25,000 |
| 16 | do | 470,000 |
| 17 | mmf | 1,000 |
| 18 | ohms | 39,000 |
| 19 | do | 820,000 |
| 21 | mmf | 15 |
| 22 | ohms | 180,000 |
| 23 | mf | .01 |
| 24 | mmf | 250 |
| 25 | ohms | 33,000 |
| 26 | mf | .05 |
| 27 | ohms | 10 |
| 28 | do | 270,000 |
| 29 | do | 100,000 |
| 31 | mf | .01 |
| 34 | mf | .1 |
| 35 | mf | 8 |
| 39 | mmf | 270 |
| 41 | ohms | 330,000 |

*Operation of the Fig. 1 embodiment*

Broadly speaking, the tube 30, in conjunction with amplifier tube 40, transformer 32, and the feedback network which includes capacitors 17 and 21 comprise a sawtooth-wave generator of the type described and claimed in my copending application Serial No. 299,532, the tube 30 in the present drawing being the counterpart of tube 40 in the aforesaid application. The present wave generator, however, differs from the one described in the former application in that the feedback circuit in the present device does not comprise any tank circuit or other sine-wave developing elements. As a result of this modification, it is not necessary in the present structure to use any tube corresponding to tube 30 of the former application; instead, the retrace pulses from the deflection yoke are differentiated by capacitor 21 and fed back directly to the grid of oscillator tube 30.

The present wave-generator apparatus, like that taught in my earlier application No. 299,532, is capable of frequency control over comparatively wide limits by variation of the grid bias on the oscillator tube 30 (corresponding to tube 40 of the earlier application). In the present invention, the control voltage for oscillator bias is derived from the phase-sensitive gated discriminator tube 20, in the following manner:

The large-amplitude retrace pulses—often more than 1,000 volta—drive the plate of tube 20 far positive. At the instant the pulse starts, the grid of tube 20 is likewise pulled positive by coupling through the grid-plate capacitance of tube 20. The result is a short-duration heavy current pulse through tube 20. This current pulse charges capacitor 11, raising the potential on the cathode of tube 20. Meanwhile, the grid-plate capacitance of tube 20 becomes charged and the grid potential drops. As a result, the flow of current through tube 20 diminishes rapidly after the commencement of the retrace pulse and has normally stopped completely well before the end of the retrace pulse.

During the periods between retrace pulses, tube 20 is wholly non-conducting, since its cathode is held at a high positive potential by the charge on capacitor 11. During those non-conducting periods, however, the charge on capacitor 11 leaks slowly off through resistor 12 and capacitor 13 have a time constant much greater than the period between successive pulses, so that they act as an integrator circuit, the capacitor 13 acquiring, after a few cycles, a charge substantially proportional to the average current through tube 20. This charge on capacitor 13 is applied through resistor 19 as grid bias for tube 30 and hence acts as the control voltage governing the frequency of the sawtooth waves generated by tube 30.

Now let us consider the effect on the operation just described of the synchronizing pulses applied to the tube 20. The total quantity of charge moved through tube 20 during each of its current pulses will be a complicated function of its electrode voltages, integrated over the period of conduction. The value of that integral will be affected by the time relationship between the synchronizing pulse and the retrace pulse. To the extent that the synchronizing pulse adds to the total electrode potentials during the period in which the tube is "saturated," that is, passing maximum current, the synchronizing pulse will have little or no effect. That portion of the synchronizing pulse, on the other hand, which comes during the latter portion of the conducting period, after the current has dropped to an intermediate value, will substantially affect the total quantity of charge transmitted through tube 20. (Normally, of course, the amplitude of the synchronizing pulses will be far less than the amplitude of the retrace pulses—perhaps a few volts as compared with several hundred.) In the Fig. 1 arrangement, wherein the polarity of the synchronizing pulse tends to aid the flow of current, the synchronizing pulse, if properly phased. will substantially increase the quantity of charge moved per conducting interval and will therefore raise the average charge on capacitor 13. Should the phase of the synchronizing pulses shift with respect to the retrace pulses, the total charge transferred during the conducting periods would be reduced and the voltage on capacitor 13 made correspondingly smaller. Hence the tube 20, while conducting at most a few microseconds out of each deflection cycle, does during those brief periods provide a control voltage which is dependent on the relative phase of the synchronizing pulses and the retrace pulses. That control voltage may be applied as shown to maintain the frequency of oscillator tube 30 in perfect step with that of the synchronizing pulses.

It will of course be understood that the apparatus will function in the same manner whether the input pulses be positive or negative, except that reversing the polarity of the sync pulses will reverse the sense of the voltage changes on capacitor 13 and hence reverse the sense of the control voltage applied to tube 30. While the polarity arrangement shown is appropriate for the particular oscillator circuit illustrated, it should be borne in mind that there may be other oscillators in which the voltage-frequency characteristic would have reverse slope, and for such oscillators the Fig. 1 circuit should be used with positive sync pulses. It is noteworthy that the sole path provided for D.-C. cathode current through tube 20 is via resistors 19 and 18 and thence from the grid of tube 30 to its cathode and to ground via resistors 25 and 27. Thus the integral of cathode current of tube 20 is equal to the integral of grid current of tube 30. This arrangement substantially improves the operation of the circuit, since it enables the discriminator tube 20 to work into an extremely high effective impedance.

As will be seen from a study of the circuit, noise energy reaching the cathode of tube 20 via capacitor 11 during the periods between retrace pulses cannot exert any effect whatever on the circuit operation, since, during those periods, both tubes 20 and 30 are non-conducting. Hence no A.-C. signal reaching the cathode of tube 20 in the intervals between pulses can either add to or subtract from the D.-C. charge on capacitor 13. This characteristic gives my circuit an extraordinary degree of immunity to noise. This immunity is further increased by the fact that the bias on tube 20 is normally several times cut-off value throughout the period between pulses and is also very substantially larger than the peak voltage of the sync pulses. Since the associated receiver circuits will normally limit the amplitude of noise pulses to substantially the peak amplitude of the sync pulses, my invention effectively prevents noise pulses, of whichever polarity, from producing conduction of tube 20 between retrace pulses.

*The Fig. 2 embodiment*

In Fig. 2 I have shown a variant of the discriminator circuit adapted for use when it is desired to use synchronizing pulses of opposite polarity without reversing the sense of the resulting control voltage developed on capacitor 13. For convenience, I have shown only the circuits associated with tube 20, the circuit of Fig. 2 being intended as a replacement for the portion of Fig. 1 to the left and below the points marked on Fig. 1 with the letters A, B, and C. As will be noted, corresponding letters C on Fig. 2 show where the Fig. 2 circuit should be joined to that of Fig. 1.

Similarly, I have in Fig. 2 used the same reference numerals as in Fig. 1 to designate corresponding circuit elements.

As study of Fig. 2 will show, the principal change from Fig. 1 consists in applying the synchronizing pulses to the grid of tube 20, rather than to its cathode. To accomplish this, the resistor network 14, 15 is replaced by a network 44, 45, of which element 44 is a potentiometer. The sync pulses are applied to the movable arm of potentiometer 44. The cathode of tube 20 is connected to ground through a capacitor 51 which acts as the biasing device in the Fig. 2 embodiment, corresponding to capacitor 11 in the Fig. 1 embodiment. As in the Fig. 1 embodiment, the voltage on capacitor 51 is integrated by means of resistor 12 and capacitor 13.

The operation of the Fig. 2 embodiment, when employed with positive sync pulses, is substantially identical to the operation of the Fig. 1 embodiment used with negative sync pulses. The total resistance of the elements 44 and 45 may be of the same order of magnitude as those of the elements 14, 15 in Fig. 1, and capacitor 51 may be of about the same size as capacitor 11 in Fig. 1.

*The embodiments of Figs. 3 and 4*

In Figs. 3 and 4 I have shown variations of my invention in which a diode is used as discriminator tube, in lieu of triode 20.

Figs. 3 and 4 are substantially identical in operation, the difference being merely that they are respectively designed for sync pulses of opposite polarity.

Fig. 3, it will be noted, is identical in circuit arrangement to that of Fig. 1 except that triode 20 has been replaced with diode 70, and the adjustable grid-resistor network 14, 15 has been eliminated and, instead, a variable resistor 16*a* has been added in series with the plate resistor 16.

In the Fig. 4 form of the invention, the synchronizing pulses are applied to the plate of the diode 70 instead of to its cathode, and it is accordingly necessary to use a capacitor 51 as a biasing capacitor for the diode, corresponding to the similarly numbered capacitor of Fig. 2.

I have found in these diode forms of the invention it is best to make capacitor 17 smaller—preferably about 100 mmf.—and to connect capacitor 21 to the upper side of capacitor 17, rather than directly to the plate of tube 70.

These diode modifications work well and are slightly cheaper and simpler than the triode forms of the invention. They are not capable of achieving synchronization over so wide a range of frequency change as the triode form, however, which is not surprising. In the triode forms of the invention, the sync pulses are effectively applied between grid and cathode of the discriminator tube, where they have a far greater effect on the space current than in the diode forms of the invention, in which they in effect simply add to or subtract from the plate-cathode voltage.

For that reason, I definitely prefer the triode form of my invention, although the diode form does work well and has the same novel advantages as the triode form with respect to keeping the synchronizing circuits biased to non-conduction and hence immune from noise during the periods between retrace pulses.

It will be understood by persons skilled in the art that while I have in this specification described in considerable detail certain specific embodiments of my invention, those embodiments are illustrative only, and many changes can be made in the structures shown without departing from the spirit of my invention.

I claim:

1. A synchronizing system comprising an electron-discharge tube having a cathode electrode, an anode electrode, and a grid electrode, said cathode and anode defining a space-current path therebetween, a first source of periodic voltage pulses, a second source of periodic voltage pulses, the frequency of the pulses from said two sources being normally substantially equal, the voltage amplitude of the pulses from said first source being much greater than the voltage amplitude of the pulses from said second source, high-resistance means connected between said grid and ground, biasing-voltage means for said tube operative normally to prevent flow of space current in said tube, said biasing voltage being substantially greater than the peak voltage of the pulses from said second source but less than the peak voltage of the pulses from the first source, circuit means applying the pulses from said first source between said anode and said cathode in a polarity tending to oppose said biasing voltage, second circuit means applying the pulses from said second source between said cathode and said grid, said tube being operative to conduct space current for at least a brief interval during the times in which pulses from said first source are acting on said tube, the total quantity of charge thus conducted being controlled by the phase relation of the two sets of pulses, output means for said discharge tube providing an output voltage varying in accordance with said space current, integrator means coupled to said output means operative to derive from said output voltage a control potential proportional to the integral of said output voltage, and means applying said control potential to said first pulse source for controlling the frequency of the pulses therefrom and thereby controlling the relative phase of the two sets of pulses.

2. A synchronizing system comprising a phase-discriminator tube having an anode electrode and a cathode electrode, said electrodes defining a space-current path therebetween, a source of periodic synchronizing voltage pulses, a wave generator comprising an oscillator tube and providing a second series of periodic voltage pulses, said oscillator tube having a grid and a cathode, the frequency of said second series of pulses being variable responsively to changes in the average potential between said grid and cathode of said oscillator tube, and the amplitude of said second series of pulses being much greater than that of said synchronizing pulses, biasing-voltage means for said discriminator tube operative normally to prevent flow of current in said space-current path, said bias voltage being greater than the peak voltage of said synchronizing pulses but being substantially less than the peak voltage of said second pulses, circuit means applying both series of pulses to said discriminator tube, at least the second series of pulses being applied in a polarity to oppose said bias voltage and to produce a corresponding series of space-current pulses through said discriminator tube, the integral of said space current varying responsively to the phase relation of said second pulses relative to said synchronizing pulses, output means for said discriminator tube providing an output voltage varying in accordance with said space current, integrator means coupled to said output means operative to derive from said output voltage a control voltage substantially proportional to the integral of said output voltage, and means applying said control voltage between the grid and cathode of said oscillator tube.

3. A synchronizing system in accordance with claim 2 wherein said grid and cathode of said oscillator tube define a space-current path therebetween, and wherein said space-current path in said oscillator tube provides the principal D.-C. return path for the space current flowing in said discriminator tube.

4. In a television receiver having means for deriving a train of synchronizing pulses from a received television signal, a cathode-ray picture tube, a deflection-wave generator for said picture tube having a control element, the frequency of said wave being variable responsively to changes in the voltage applied to said control element, and means for applying the deflection wave to the picture tube comprising an inductive load device operative during the retrace portions of said deflection wave to generate short-duration high-voltage pulses, deflection-wave synchronizing apparatus comprising a phase-discriminator tube having an anode electrode and a cathode electrode, said electrodes defining a space-current path therebetween, biasing-voltage means for said tube operative normally to prevent flow of space current in said tube, said biasing voltage being substantially greater than the peak voltage of said synchronizing pulses but less than the peak voltage of said retrace pulses, circuit means applying said synchronizing pulses and said retrace pulses to said discriminator tube, the retrace pulses being applied to said tube in a polarity tending to oppose said biasing voltage and to produce pulses of space current in said tube, the integral of said space current varying in accordance with the phase relation between said synchronizing pulses and said retrace pulses, output means for said discriminator tube, integrator means coupled to said output means operative to derive a control potential substantially proportional to the integral of said space current, and other circuit means applying said control potential to said control element.

5. Apparatus according to claim 4 wherein said phase-discriminator tube is provided with a grid electrode disposed between said anode and said cathode, and wherein said synchronizing pulses are applied to said phase-discriminator tube in a manner operative to apply said synchronizing pulses between said grid and said cathode.

6. Apparatus according to claim 4 wherein said wave generator comprises an oscillator tube having a grid and a cathode, said grid being said control element, said grid and said cathode defining a space-current path therebetween, and wherein said space-current path of said oscillator tube provides the principal D.-C. return path for the space current flowing in said discriminator tube.

References Cited in the file of this patent

UNITED STATES PATENTS 2,141,343 Campbell ______________ Dec. 27, 1938